(12) United States Patent
Morelli et al.

(10) Patent No.: US 8,289,175 B2
(45) Date of Patent: Oct. 16, 2012

(54) FLUID LEVEL WARNING SYSTEM FOR VEHICLE

(75) Inventors: Roberto Morelli, Chihuahua (MX); Luis M. Porras, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 1414 days.

(21) Appl. No.: 11/906,392

(22) Filed: Oct. 2, 2007

(65) Prior Publication Data

US 2009/0085757 A1    Apr. 2, 2009

(51) Int. Cl.
*G08B 21/00* (2006.01)
*G01F 19/00* (2006.01)
*G01F 25/00* (2006.01)

(52) U.S. Cl. .......................................... 340/626; 73/1.73
(58) Field of Classification Search .................... 340/612
See application file for complete search history.

(56) References Cited

U.S. PATENT DOCUMENTS

| 3,642,036 A * | 2/1972 | Ginsburgh et al. | 141/94 |
| 5,755,256 A * | 5/1998 | Elsdon et al. | 137/390 |
| 6,253,803 B1 * | 7/2001 | Nusbaumer et al. | 141/94 |
| 2008/0245129 A1 * | 10/2008 | Wang et al. | 73/1.73 |

* cited by examiner

*Primary Examiner* — Benjamin C Lee
*Assistant Examiner* — Cal Eustaquio
(74) *Attorney, Agent, or Firm* — Mark H. Svoboda

(57) ABSTRACT

A fluid level sensor for generating a warning upon, e.g., low fuel conditions in a vehicle gas tank. A vacuum conduit is disposed in the tank. The vacuum conduit has first and second vacuum openings and an actuation opening into which the fuel pump can pump fluid through a Venturi conduit to induce a vacuum. A first conduit extends from the first vacuum opening to a vacuum sensor outside the tank and a second conduit extends from the second vacuum opening. The second conduit extends down into the tank and terminates in an open end. When fluid in the tank drops below the opening the vacuum sensor senses a change in vacuum in the tank, triggering a low level alarm.

10 Claims, 1 Drawing Sheet

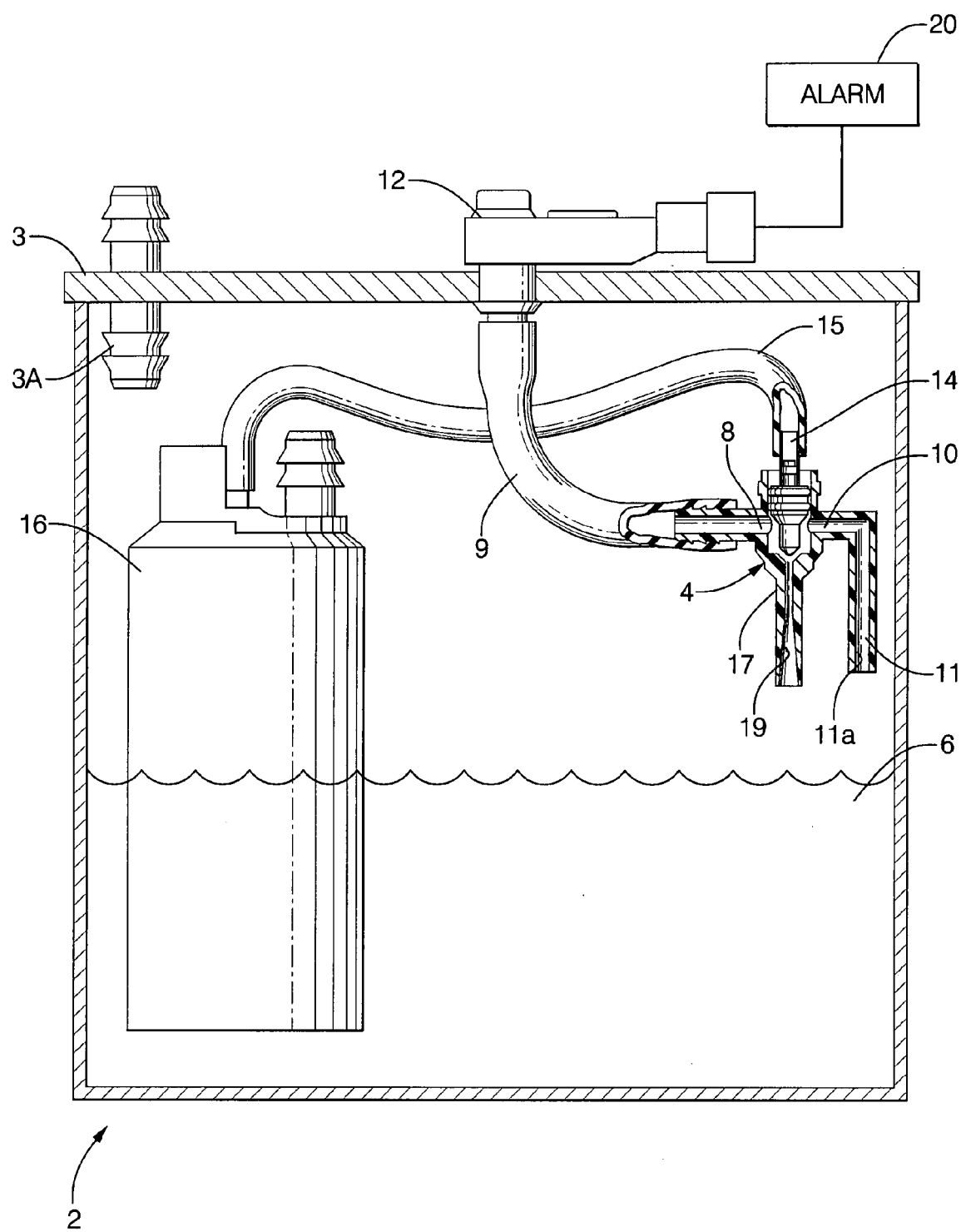

FLUID LEVEL WARNING SYSTEM FOR VEHICLE

FIELD OF THE INVENTION

The present invention relates generally to fluid level warning systems, and more particularly to fluid level warning systems for vehicle.

BACKGROUND OF THE INVENTION

There is more than one prior apparatus that acts as a warning sensor by detecting fluid level change. Most of these are prone to reliability problems because of their mechanical functionality. An example of a prior apparatus with a reliability issue is one that includes a magnet contained in a float that closes or opens an electrical switch. Another issue lies with ultrasonic sensors, which tend to be relatively expensive. As understood herein, a fluid level warning sensor that works using a vacuum and no mechanical devices to warn when the fluid reaches a low or high level limit thus would provide several advantages in regard to durability, functionality, and cost.

SUMMARY OF THE INVENTION

A fluid level sensor includes a vacuum conduit disposable in a tank such as a vehicle gas tank. The tank contains fluid, and the vacuum conduit has first and second vacuum openings and an actuation opening. A first conduit extends from the first vacuum opening to a vacuum sensor disposable outside the tank, while a second conduit extends from the second vacuum opening and has an open end. A source of fluid such as a fuel pump may be connected to the actuation opening to provide fluid into the actuation opening and out of an outlet conduit that may be formed as a Venturi to thereby establish a vacuum in the vacuum conduit. With this structure, fluid in the tank that interacts with the open end of the second conduit affects pressure in the first conduit, which can be sensed by the vacuum sensor.

In non-limiting implementations the second conduit can include a passageway at least a portion of which is oriented vertically when disposed in the tank. An alarm can be activated based on an output of the sensor. The vacuum conduit and the first and second conduits may be fixedly disposed in the tank.

In another aspect, a fluid level sensor for generating a warning upon low fuel conditions in a vehicle gas tank includes a vacuum conduit disposable in the tank. The vacuum conduit has first and second vacuum openings and an actuation opening into which a fuel pump can pump fluid. A Venturi conduit fluidly communicates with the actuation opening and terminates in an open end such that fluid can be pumped into the actuation opening, through the Venturi conduit, and out the open end of the Venturi conduit to induce vacuum in the vacuum conduit. A first conduit extends from the first vacuum opening to a vacuum sensor and a second conduit extends from the second vacuum opening down into the tank, terminating in an open end. With this structure, when fluid in the tank drops below the opening the vacuum sensor senses a change in vacuum in the tank, triggering a low level alarm.

In still another aspect, a method for sensing fluid level in a vehicle fluid container includes disposing a vacuum conduit in the container, with the vacuum conduit having first and second vacuum openings and an actuation opening. The method includes extending a first conduit from the first vacuum opening to a vacuum sensor and extending a second conduit from the second vacuum opening, the second conduit having an open end. Furthermore, the method includes extending a third conduit from the actuation opening. A source of fluid is connected to the actuation opening to provide fluid into the actuation opening and out of the third conduit and thereby establish a vacuum in the vacuum conduit. Accordingly, fluid in the container associated with the open end of the second conduit affects pressure in the first conduit, and the pressure is sensed by the vacuum sensor.

The details of the present invention, both as to its structure and operation, can best be understood in reference to the accompanying drawings, in which like reference numerals refer to like parts, and in which:

BRIEF DESCRIPTION OF THE DRAWINGS

The FIGURE shows an embodiment of the fluid level sensor of the invention disposed in one intended non-limiting embodiment.

DETAILED DESCRIPTION OF THE PREFERRED EMBODIMENT

Referring to the FIGURE, a tank, generally labeled 2, is shown that typically may include a cover 3 and a fluid inlet 3A. The tank 2 also contains a vacuum conduit 4. The tank holds a fluid 6, and in one aspect the tank 2 is a fuel tank in a vehicle, in which case the fluid inlet 3A is a fuel inlet.

As shown, the vacuum conduit 4, which may be a hollow pipe or tube, has opposed vacuum openings 8 and 10 that are connected to respective separate conduits 9 and 11, with the opening 8 being fluidly connected via the conduit 9 to a vacuum sensor 12 that can be disposed outside the tank and with the opening 10 being fluidly connected via the conduit 11 to the inside of the tank where the fluid is held. If desired, the vacuum conduit 4 and the conduits 9 and 11 may be fixedly disposed in the tank 2, and the conduits 4, 9, and 11 may be separate conduits that are joined together as shown or may be parts of a single unitary structure.

In accordance with present principles, the vacuum conduit 4 is also formed midway between the openings 8, 10 with an actuation opening 14 that is connected via a line 15 to an outside source of fluid, such as a fuel pump 16 that may be disposed in the tank or in a fuel return line. As shown, the vacuum conduit 4, which may be oriented horizontally in the tank 2, may join an outlet conduit 17 that is formed with a narrow portion 19 to in effect establish a Venturi, although the outlet conduit 17 in less preferred implementations may be a simple tube that is not a Venturi. In one implementation the outlet conduit 17 as well as the second conduit 11 can be oriented vertically in the tank 2 as shown.

With the above in mind, the source of fluid pumps or directs fluid through the actuation opening 14 and through and out the outlet conduit 17 to establish a vacuum in the conduit system shown. The fluid 6 interacting with the open bottom end 11a of the second conduit 11 affects the pressure in the opening 8, which is sensed by the vacuum sensor 12. The change in pressure causes an output of the sensor to activate an alarm 20 such as a fluid level high or low warning lamp in a vehicle.

There are two states of the pressure in the vacuum opening 11a: no (or less) vacuum and (more) vacuum. The state in which no vacuum is generated occurs when no fluid 6 interacts with the open end 11a of the conduit 11, i.e., when the fluid level is below the open end 11a. In this case, air freely flows through the open end of the conduit 11, destroying the vacuum established by the flow of fluid through the outlet conduit 17.

In contrast, when fluid immerses the open end 11a of the conduit 11, air does not freely move through the open end 11a so that a vacuum is established by the action of the fluid flowing through the actuation opening 14 and outlet conduit 17. This vacuum (or lack thereof) is sensed by the vacuum sensor 12.

In one implementation the sensor may be used as a high fluid level sensor, in which an alarm is activated by rising fluid levels. The state change from no vacuum to vacuum can be used to actuate the alarm. However, in order to avoid a spurious alarm when fluid splashes and intermittently immerses the open end 10 for short periods of time, some embodiments may have a set time period for which this single state change must continuously occur before the alarm is signaled.

The other possible state change, from vacuum to no vacuum, results from fluid level dropping below the height of the open bottom end 11a. If it is desired to establish a low fluid level sensor, any lack of vacuum sensed by the vacuum sensor 12 can set off an alarm. Once again, the fluid may splash around and cause rapid state changes between vacuum and no vacuum as the fluid level is dropping. To avoid a spurious alarm, the alarm may be activated the instant no vacuum is achieved and deactivated only after a predetermined time period during which a vacuum is continuously sensed, essentially locking in the alarm until the fluid level rises above the open end 10 for more than an intermittent period.

While the particular FLUID LEVEL WARNING SYSTEM FOR VEHICLE is herein shown and described in detail, it is to be understood that the subject matter which is encompassed by the present invention is limited only by the claims. For instance, as shown in the FIGURE the open end 10 may be slightly higher in the tank 2 than the bottom end of the outlet tube 17.

What is claimed is:

1. A fluid level sensor, comprising:
   a vacuum conduit disposable in a tank containing fluid, the vacuum conduit having first and second vacuum openings and an actuation opening;
   a first conduit extending from the first vacuum opening to a vacuum sensor disposable outside the tank;
   a second conduit extending from the second vacuum opening and having an open end; and
   a pump disposed in the tank connectable to the actuation opening to provide fluid into the actuation opening and out of the second conduit to thereby establish a vacuum in the vacuum conduit, wherein fluid in the tank interacting with the open end of the second conduit affects pressure in the first conduit and is sensed by the vacuum sensor.

2. The sensor of claim 1, wherein the second conduit includes a passageway at least a portion of which is oriented vertically when disposed in the tank.

3. The sensor of claim 1, comprising an alarm activated at least in part based on an output of the sensor.

4. The sensor of claim 1, comprising the tank, the vacuum conduit and the first and second conduits being fixedly disposed in the tank.

5. The sensor of claim 4, wherein the tank is a vehicle fuel tank.

6. A method for sensing fluid level in a vehicle fluid container, comprising:
   disposing a vacuum conduit in the container, the vacuum conduit having first and second vacuum openings and an actuation opening;
   extending a first conduit from the first vacuum opening to a vacuum sensor;
   extending a second conduit from the second vacuum opening, the second conduit having an open end;
   extending a third conduit from the actuation opening; and
   connecting pump disposed in the container to the actuation opening to provide fluid into the actuation opening and out of the third conduit and thereby establish a vacuum in the vacuum conduit, wherein fluid in the container associated with the open end of the second conduit affects pressure in the first conduit, the pressure being sensed by the vacuum sensor.

7. The method of claim 6, wherein the second conduit includes a passageway at least a portion of which is oriented vertically in the container.

8. The method of claim 6, comprising activating an alarm at least in part based on an output of the sensor.

9. The method of claim 6, comprising fixedly disposing the vacuum conduit and the first and second conduits in the container.

10. The method of claim 9, wherein the container is a vehicle fuel tank.

\* \* \* \* \*